(12) United States Patent
Takashima (10) Patent No.: US 11,599,192 B2
(45) Date of Patent: Mar. 7, 2023

(54) IMAGE PRESENTATION APPARATUS, IMAGE PRESENTATION METHOD, RECORDING MEDIUM, AND PROGRAM

(71) Applicant: SONY INTERACTIVE ENTERTAINMENT INC., Tokyo (JP)

(72) Inventor: Shinji Takashima, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 126 days.

(21) Appl. No.: 17/047,379

(22) PCT Filed: Apr. 26, 2018

(86) PCT No.: PCT/JP2018/017052
§ 371 (c)(1),
(2) Date: Oct. 13, 2020

(87) PCT Pub. No.: WO2019/207728
PCT Pub. Date: Oct. 31, 2019

(65) Prior Publication Data
US 2021/0116997 A1     Apr. 22, 2021

(51) Int. Cl.
*G06F 3/033*     (2013.01)
*G09G 3/20*     (2006.01)
(Continued)

(52) U.S. Cl.
CPC ............. *G06F 3/013* (2013.01); *G06N 20/00* (2019.01)

(58) Field of Classification Search
CPC ........ G04N 13/04; H04N 13/00; H04N 13/02; H04N 9/75; G02B 27/01; G09G 3/20;
(Continued)

(56) References Cited

U.S. PATENT DOCUMENTS 9,724,597 B2 * 8/2017 Mikhailov ............ A63F 13/213
9,921,052 B2 * 3/2018 Ikenoue ................ A63F 13/422
(Continued)

FOREIGN PATENT DOCUMENTS

JP     2006-040055 A     2/2006
JP     2012-165338 A     8/2012
(Continued)

OTHER PUBLICATIONS

Decision of Refusal dated Aug. 24, 2021, from Japanese Patent Application No. 2020-515404, 5 sheets.
(Continued)

*Primary Examiner* — Pegeman Karimi
(74) *Attorney, Agent, or Firm* — Katten Muchin Rosenman LLP (57) ABSTRACT

Provided is an image presentation apparatus configured to present a virtual space image to a user. The image presentation apparatus receives acquisition information that is acquired during the presentation of the image and a notification from the user that indicates that the user has entered a predetermined condition. The image presentation apparatus learns a relationship between the acquisition information and content of the notification by machine learning. A result of the machine learning is used for predetermined processing during the presentation of the virtual space image to the user.

11 Claims, 5 Drawing Sheets

(51) Int. Cl.
*G06F 3/01* (2006.01)
*G06N 20/00* (2019.01)

(58) Field of Classification Search
CPC ... G09G 5/30; G09G 5/02; G09G 5/08; G06F 3/033; A63F 13/213; G06T 7/11
See application file for complete search history.

(56) References Cited

U.S. PATENT DOCUMENTS

| | | | | |
|---|---|---|---|---|
| 2010/0303297 | A1* | 12/2010 | Mikhailov | G06T 7/11 |
| | | | | 382/103 |
| 2011/0034244 | A1* | 2/2011 | Marks | A63F 13/5372 |
| | | | | 345/158 |
| 2012/0249422 | A1* | 10/2012 | Tse | G06F 3/0304 |
| | | | | 345/158 |
| 2015/0209664 | A1* | 7/2015 | Haseltine | G06F 3/011 |
| | | | | 463/31 |

FOREIGN PATENT DOCUMENTS

| | | |
|---|---|---|
| JP | 2016-200753 A | 12/2016 |
| JP | 2017-054457 A | 3/2017 |
| WO | 2012/060039 A1 | 5/2012 |
| WO | 2015/107817 A1 | 7/2015 |

OTHER PUBLICATIONS

Tanaka Nobuji, "Examination of the presumption system of the user's VR sickness characteristics for the purposes of" VR sickness, Journal of Human-Interface Society, Nov. 25, 2006, vol. 8 No. 4, p. 100-101 (newly cited document; documents showing well-known arts), and—(a document that is newly cited; documents showing well-known arts), 15 sheets.

International Search Report and Written Opinion dated Jun. 12, 2018, from PCT/JP2018/017052, 11 sheets.

International Preliminary Report on Patentability dated Nov. 5, 2020, from PCT/JP2018/017052, 19 sheets.

\* cited by examiner

IMAGE PRESENTATION APPARATUS, IMAGE PRESENTATION METHOD, RECORDING MEDIUM, AND PROGRAM

TECHNICAL FIELD

The present invention relates to an image presentation apparatus, an image presentation method, a recording medium, and a program.

BACKGROUND ART

A display apparatus that is worn on the head of a user and presents a virtual space image to the user has recently become widespread. When using such a display apparatus, the user sometimes gets motion sickness with, for example, display that continuously moves the field of view of the user in a displayed virtual space (what is called virtual reality (VR) motion sickness).

To reduce such motion sickness, there have been considered various methods such as discontinuously moving the field of view of a user, providing vibration to a user along with movement, and using what is called a motion chair that makes a user feel a weight shift. It has turned out that the effect of each measure differs depending on individual differences in users such as the users' eyesight or ages.

SUMMARY

Technical Problem

It has therefore been demanded to perform processing against motion sickness depending on individual differences in users such as the processing of estimating the possibility of motion sickness, detecting motion sickness, or reducing motion sickness.

The present invention has been made in view of the above-mentioned circumstances, and has an object to provide an image presentation apparatus, an image presentation method, a recording medium, and a program capable of executing processing against motion sickness depending on individual differences in users.

Solution to Problem

According to the present invention that solves the related-art problem described above, there is provided an image presentation apparatus configured to present a virtual space image to a user, including: acquisition information reception means for receiving acquisition information that is acquired during the presentation of the image; notification reception means for receiving a notification from the user that indicates that the user has entered a predetermined condition; and learning processing means for learning a relationship between the acquisition information and content of the notification by machine learning, in which a result of the machine learning is used for predetermined processing during the presentation of the virtual space image to the user.

Advantageous Effects of Invention

With this, it is possible to execute processing against motion sickness depending on individual differences in users.

DESCRIPTION OF EMBODIMENT

An embodiment of the present invention is described with reference to the drawings. An image presentation apparatus 1 according to the embodiment of the present invention includes, as exemplified in FIG. 1, a display device 10 and an information processing apparatus 20 communicably connected to the display device 10.

Figure 1:
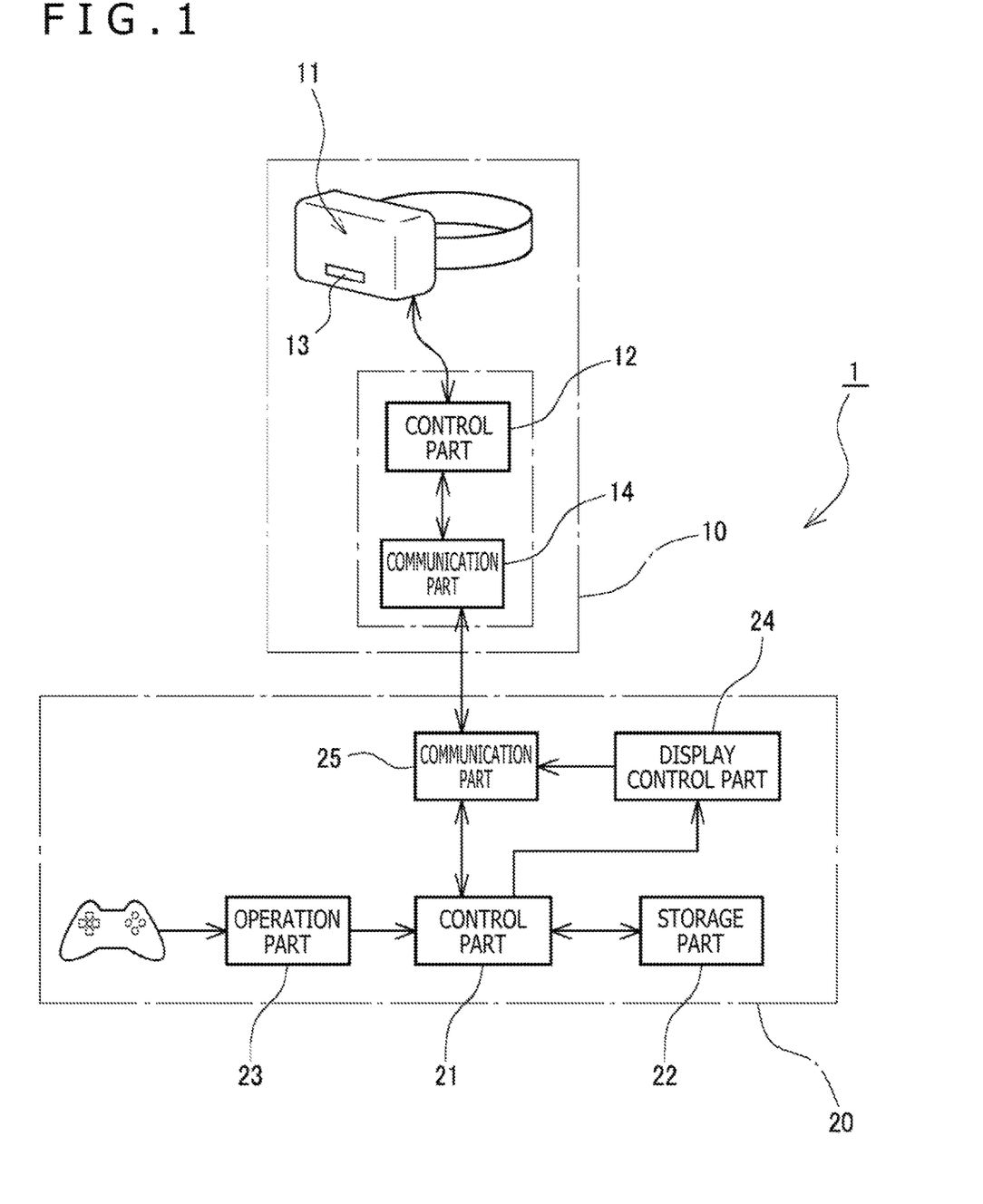
FIG. 1 is a schematic block diagram illustrating a configuration example of an image presentation apparatus according to an embodiment of the present invention.

Note that, in the example of FIG. 1, the display device 10 is what is called a head mounted display (HMD) that is worn on the head of a user during use. The display device 10 includes a display part 11, a control part 12, a sensor part 13, and a communication part 14.

Further, the information processing apparatus 20 includes, as exemplified in FIG. 1, a control part 21, a storage part 22, an operation part 23, a display control part 24, and a communication part 25.

Here, the control part 21 of the information processing apparatus 20 is a program control device such as a central processing unit (CPU), and operates in accordance with a program stored in the storage part 22. The control part 21 of the present embodiment executes the program to perform the processing of presenting a virtual space image to the user, and to receive acquisition information that is acquired during the presentation of the image and a notification from the user that indicates that the user has entered a predetermined condition. Then, the control part 21 learns a relationship between the acquisition information and the content of the notification by machine learning. A specific processing example of the control part 21 is described later.

The storage part 22 includes a memory device or a disk device, and stores programs that are executed by the control part 21. The programs may be provided by being stored in computer-readable non-temporary storage media such as a digital versatile disc-read only memory (DVD-ROM), and copied to the storage part 22 to be stored therein. Further, the storage part 22 operates also as a work memory for the control part 21.

The operation part 23 is connected to an input device such as a mouse, a keyboard, a button, or a game controller. The operation part 23 receives the operation of the user from the input device, and outputs information indicating the content of the received operation to the control part 21. The display control part 24 sends, in accordance with an instruction input from the control part 21, information to be output to the display device 10 to be displayed thereon through the communication part 25. As an example, the display control part 24 receives, from the control part 21, the input of information regarding an image to be presented to the user (a pair of images for the left eye and the right eye to be displayed on the display device 10) at a predetermined timing (for example, every 1/30 seconds), and sends the image information through the communication part 25.

The communication part 25 is connected to the display device 10 and transmits, to the display device 10, information output from the display control part 24. Further, the communication part 25 receives information transmitted from the display device 10 and outputs the information to the control part 21.

Figure 2:
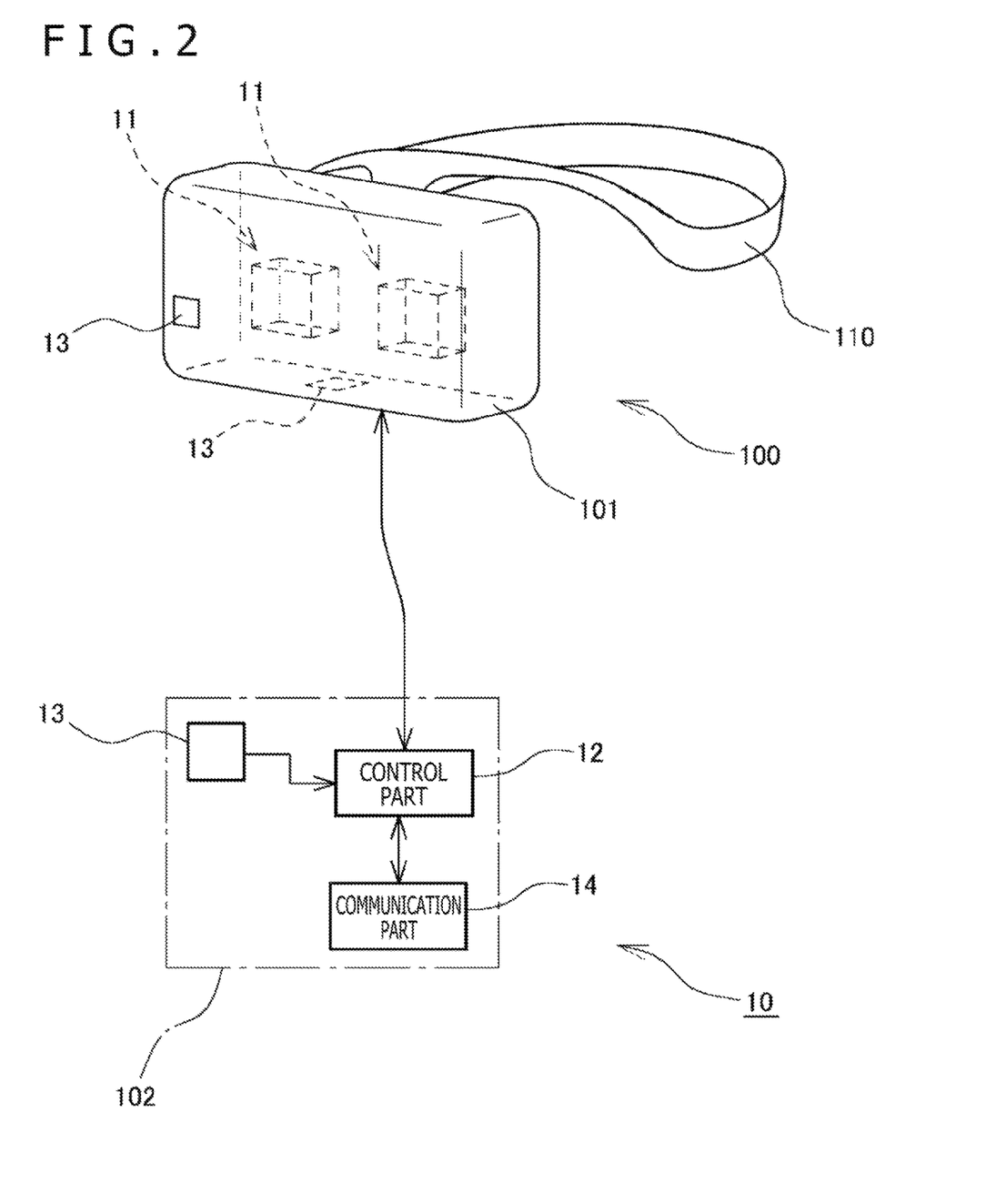
FIG. 2 is a schematic explanatory diagram illustrating an example of a display device according to the embodiment of the present invention.

The display device 10 includes, as exemplified in FIG. 2, a display unit 100 provided on the front side (a side that corresponds to the face side when the user wears the display device 10) and a wearing band 110 formed into a circumferential shape. The wearing band 110 supports the display unit 100, and extends from the front side to the back side (a side that corresponds to the head back side when the user wears the display device 10) along one side (left or right) of the user's head, to thereby reach the front side along the other side of the head. The perimeter of the wearing band 110 is adjustable depending on the size of the user's head, and the user adjusts the wearing band 110 depending on the size of his/her head to fix the display device 10 to the head.

Further, the display unit 100 includes a box-shaped housing 101 that opens on one side (a side that corresponds to the face side when the user wears the display device 10). The display part 11 is provided inside the housing 101. Moreover, in an example of the present embodiment, a processor unit 102 connected to the display part 11 inside the housing 101 is provided outside the housing. The control part 12 and the communication part 14 are provided inside the processor unit 102. Note that, such an arrangement is an example, and the processor unit 102 is not necessarily required. For example, the control part 12 and the communication part 14 may be provided inside the housing 101 of the display unit 100.

The display part 11 displays, in front of the right and left eyes of the user, field-of-view images corresponding to the respective eyes. Specifically, the display part 11 includes a display element such as an organic electroluminescent (EL) display panel or a liquid-crystal display panel, and the display element displays video in accordance with an instruction input from the control part 12. The display element may be one display element configured to display a left-eye image and a right-eye image in a row, or may include a pair of display elements configured to individually display a left-eye image and a right-eye image. Note that, the display device 10 may be a non-transmissive display apparatus that does not allow the user to see the outside world or a transmissive display apparatus that allows the user to see the outside world together with information displayed on the display element.

The control part 12 is a microcomputer or the like, and operates in accordance with programs stored in a built-in memory, for example. In the present embodiment, the control part 12 controls, on the basis of information input through the communication part 14, the display part 11 to display images. Further, the control part 12 sends information output from the sensor part 13 to the information processing apparatus 20 through the communication part 14 at a predetermined timing (for example, regularly).

The sensor part 13 includes at least one of a pulse wave sensor, a respiration sensor, a humidity sensor, or a temperature sensor, for example. The sensor part 13 outputs information detected by the sensor to the control part 12.

Here, the sensor part 13 may be provided to the display unit 100 or the wearing band 110. Specifically, a pulse wave sensor that is an example of the sensor part 13 may be provided to, for example, a portion of the wearing band 110 that is brought into abutment against the ear when the user wears the display device 10 so that the pulse wave sensor is brought into contact with the user's earlobe to detect the pulse from the blood flowing through the earlobe.

Further, a humidity sensor or a temperature sensor that is another example of the sensor part 13 is provided inside the housing 101 of the display unit 100 to detect humidity or humidity inside the housing 101. The humidity is affected by the user's sweat rate while the temperature is affected by the user's body temperature. Alternatively, humidity sensors or temperature sensors may be provided to two locations, that is, outside the housing 101 (for example, a portion of the front outer surface of the display device 10 that is farthest from the user's face) and inside the housing 101, to thereby detect humidity or temperature at the respective locations.

Note that, the sensor part 13 is not necessarily integrally configured with the display unit 100 and the like of the display device 10, and may be separated from the display unit 100 of the display device 10. The sensor part 13 may be provided on a belt that the user wears on his/her chest, wrist, or the like, and connected to the control part 12 wirelessly or wiredly. For example, a respiration sensor or the like may be provided on a belt that is worn around the user's chest, and detect breathes or the like from the movement of the chest.

The communication part 14 sends, in accordance with an instruction input from the control part 12, information detected by the sensor part 13 to the information processing apparatus 20. Further, the communication part 14 outputs information received from the information processing apparatus 20 to the control part 12.

Now, the operation of the control part 21 of the information processing apparatus 20 is described. In an example of the present embodiment, the control part 21 functionally includes, as exemplified in FIG. 3, an application processing part 31, an information acquisition part 32, a learning part 33, and a motion sickness determination part 34. Here, the learning part 33 includes a notification reception part 41 and a learning processing part 42. Further, the motion sickness determination part 34 includes an estimation part 51 and an anti-motion sickness processing part 52.

Figure 3:
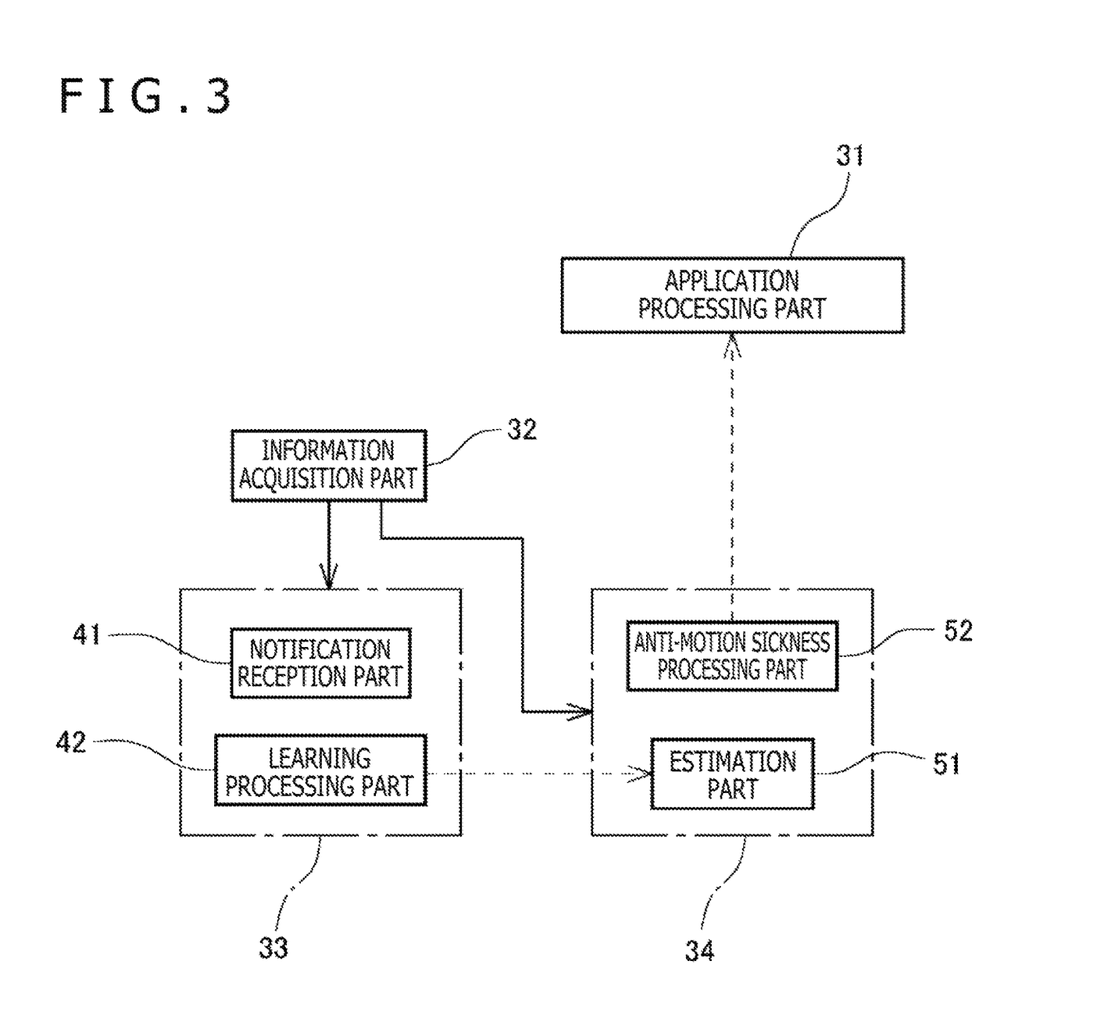
FIG. 3 is a functional block diagram illustrating an example of an information processing apparatus according to the embodiment of the present invention.

Here, the application processing part 31 executes the processing of a game application or the like, and outputs, during the execution, information (the screen of the game or the like) regarding an image to be presented to the user (the player of the game) to the display control part 24 so that the display device 10 presents the image. In the example of the present embodiment, the display device 10 displays a three-dimensional virtual space (VR space) image (an image including the left-eye and right-eye images of the virtual space that are presented to the left eye and right eye of the user, respectively), and hence the application processing part 31 outputs, as the image to be presented to the user, the left-eye and right-eye images of the virtual space.

Further, the application processing part 31 may perform, depending on the processing of the game application or the like being executed, the processing of outputting sound, the processing of vibrating the game controller to provide an perceptual effect to the user, or the processing of, in a case where the user is sitting on a motion chair apparatus or the like, tilting or vibrating the chair apparatus, to thereby provide a bodily sensation to the user, for example. Those processing processes may be used alternatively or in any combination.

The application processing part 31 also receives operation that the user performs on the game controller or the like, and updates, depending on the operation by the user, for example, the point of view in the virtual space or the content of the game. Meanwhile, the user watches the virtual space image presented as a result of the operation of the application processing part 31 through the display device 10.

The information acquisition part 32 receives the input of predetermined prior information from the user before the application processing part 31 executes a game application, for example, at the time of the initial installation of the system or user registration, and stores the prior information in the storage part 22.

Here, the prior information includes information associated with the user's personal characteristics such as the user's sex and age (an input indicating an age group such as "1" representing teens or "2" representing twenties may be used), and information associated with the user's eyes conditions. Here, the information associated with the user's eyes conditions includes at least some of information associated with the eyesight (binary information indicating whether the user has short-sightedness or not may be used), information associated with whether the user has long-sightedness or not, information associated with whether the user has astigmatism or not, and information associated with the field of view, for example.

Further, the information acquisition part 32 receives acquisition information that is acquired while the application processing part 31 is executing the game application (a virtual space image is being presented to the user).

The acquisition information that is received here includes information associated with the content of the virtual space (content information) and the vital information of the user. Here, the information associated with the content of the virtual space includes, for example, the execution time of the application (for example, how much time has passed since the user had started playing the game application) and information indicating how much the virtual space image being presented is moved such as the rotation speed of a camera in the virtual space (information indicating how fast the user's field of view is moved in each rotation angle direction), the position of the camera (information indicating a position in the virtual space, that is, in which point of view the presented image is), the rotation angle (information indicating, by a tilt angle in each rotation angle direction or the like, how much the field of view is tilted in the virtual space), the movement speed (the movement speed of the user in the virtual space), and the acceleration (rotational acceleration in each rotation angle direction or the like). Note that, the rotation angle direction means a direction around an X, Y, or Z axis in a coordinate system with the user or the camera being the center. For example, the Z axis is the direction of a field of view of the user that the user has first taken in the virtual space, the X axis is a horizontal direction in a plane (screen plane) having the Z axis as its normal, and the Y axis is an axial direction orthogonal to both the Z and X axes in the screen plane (that is, the rotation angle direction means the direction of each rotation angle, that is, a rotation angle around the Z axis (roll angle), a rotation angle around the X axis (pitch angle), or a rotation angle around the Y axis (yaw angle)).

Further, the information associated with the content of the virtual space may include information associated with the image itself, for example, information such as the number of colors or presented objects or the displayed size of each object.

Further, the vital information of the user that is part of the acquisition information, which is received by the information acquisition part 32, includes information that is collected from the sensor part 13 or like of the display device 10 that the user is wearing. Here, the vital information includes, for example, the user's heart rate or respiratory rate (the number of breaths per minute or the like), humidity (humidity inside the housing 101 of the display device 10 that the user is wearing), or temperature (the user's body temperature or the like). Note that, in a case where as information that the display device 10 has collected from the sensor part 13, information regarding a humidity Hin or the like inside the housing 101 of the display device 10 and information regarding a corresponding humidity Hout or the like outside the housing 101 are output, the information acquisition part 32 may obtain, for example, a difference Hout−Hin between the pieces of corresponding information regarding inside and outside the housing 101. With this, the effects of the sweat of the user inside the housing 101 on humidity or the like and the effects of the body temperature on temperature or the like can be obtained.

The notification reception part 41 receives, when the user operates the game controller or the like to notify that the user has entered a predetermined condition, the content of the operation. Here, the fact that the user has entered a predetermined condition means that the user has gotten motion sickness, for example. That is, in the example of the present embodiment, when the user performs operation to notify that the user has gotten motion sickness, the notification reception part 41 receives the content of the operation. Here, the notification indicating that the user has gotten motion sickness is made by, for example, predetermined operation on the button of the game controller or the like. Further, the content of the notification may be binary information indicating whether the user has gotten motion sickness or not or a notification based on the user's subjectivity on the degree of motion sickness. In a case where a notification of the degree of motion sickness is received, the information that is received by the notification reception part 41 is graded numerical information such as integer values of from 0 to 1023, for example. The input of the degree of motion sickness may be obtained on the basis of pressing force on the button in a case where pressing force is acquirable, or of a button pressing frequency (how many times the button is pressed in a predetermined period of time). For example, the degree of motion sickness may be determined as "n" when the button has been operated n times in the last one minute.

The learning processing part 42 leans a relationship between acquisition information and the content of a notification by machine learning. In the present embodiment, the learning processing part 42 executes machine learning processing with input information (explanatory variable) being the prior information acquired by the information acquisition part 32 to be stored in the storage part 22 and acquisition information such as information associated with the content of a virtual space and the vital information of the user, and output information (objective variable) being the content of a notification of motion sickness received by the notification reception part 41 (binary information indicating whether the user has gotten motion sickness or not or numerical information indicating the degree of motion sickness).

The machine learning processing may use a neural network. Alternatively, the machine learning processing may use a decision tree or the like in a case where a combination of factors is determined. The learning processing part 42 stores, in the storage part 22, information regarding the neural network or the decision tree (or a plurality of the decision trees) obtained as a result of the machine learning processing.

For example, the learning processing part 42 uses the prior information and each piece of information included in the acquisition information such as the information associated with the content of the virtual space and the vital information of the user as explanatory variables (N explanatory variables), and randomly takes, from the set of the explanatory variables, a plurality of the explanatory variables (less than N explanatory variables, for example, the maximum number of explanatory variables that does not exceed N/3), to thereby obtain a plurality of subsets of the explanatory variables.

Then, the learning processing part 42 performs the learning processing with the decision tree (regression tree) by using the explanatory variables included in each subset. In the learning processing, for example, a widely-known method using the Gini's diversity index as an evaluation function can be employed, and hence the detailed description thereof is omitted herein.

Further, the motion sickness determination part 34 executes, by using the result of the above-mentioned machine learning, predetermined processing during the presentation of a virtual space image to the user. Specifically, the estimation part 51 of the motion sickness determination part 34 reads out the prior information acquired by the information acquisition part 32 to be stored in the storage part 22. Further, the estimation part 51 reads out information regarding a neural network or a decision tree stored in the storage part 12 as the result of the machine learning processing.

Moreover, the estimation part 51 receives, while the application processing part 31 is executing a game application (a virtual space image is being presented to the user), acquisition information acquired and output by the information acquisition part 32.

The estimation part 51 obtains an estimation result on a notification of motion sickness (binary information indicating whether there is a notification of motion sickness or not or numerical information indicating the degree of motion sickness) by using, as inputs, the read-out prior information and the received acquisition information in a read-out neural network or decision tree that is the result of the machine learning processing.

The anti-motion sickness processing part 52 executes predetermined anti-motion sickness processing when determining that conditions that make the user get motion sickness are satisfied on the basis of an estimation result on a notification of motion sickness (binary information indicating whether there is a notification of motion sickness or not or numerical information indicating the degree of motion sickness) obtained by the estimation part 51.

As an example, the anti-motion sickness processing part 52 determines that conditions that make the user get motion sickness are satisfied in a case where the estimation part 51 outputs information indicating that there is a notification of motion sickness (in the case of binary information), or a value exceeding a threshold determined in advance as a numerical value indicating the degree of motion sickness.

When the anti-motion sickness processing part 52 determines that conditions that make the user get motion sickness are satisfied, for example, the anti-motion sickness processing part 52 instructs the application processing part 31 to interrupt the processing of a game application or the like so that the application processing part 31 interrupts the processing of the game or the like, and instructs the display control part 24 to display a warning "possibility of motion sickness."

Alternatively, when determining that conditions that make the user get motion sickness are satisfied, the anti-motion sickness processing part 52 may instruct the display control part 24 to display a predetermined icon or an information window on the screen to present the warning "possibility of motion sickness" without interrupting the processing of a game application or the like.

Moreover, when determining that conditions that make the user get motion sickness are satisfied, the anti-motion sickness processing part 52 may execute the processing of changing the way in which a virtual space image is being presented, for example.

For example, in a case where the display control part 24 receives, from the control part 21, the input of information regarding an image to be presented to the user at a predetermined timing (for example, every ⅓₀ seconds), and sends the image information through the communication part 25, the anti-motion sickness processing part 52 may make the display control part 24 change the image information sending rate (the above-mentioned predetermined timing) to send image information to the screen only every ½ seconds, for example. With this, the way in which the virtual space image is being presented is changed so that the animation display that is changed at high speed is changed to stop-motion display.

Further, in a case where a substitute image for reducing motion sickness can be prepared in advance in a game application or the like that is executed by the application processing part 31, when determining that conditions that make the user get motion sickness are satisfied, the anti-motion sickness processing part 52 may instruct the application processing part 31 to present the substitute image for reducing motion sickness in the processing of the game application. In the latter example, in the processing of the application, processing for reducing motion sickness is performed.

Operation

The present embodiment has the configuration described above and operates as follows. In an example of the present embodiment, the information processing apparatus 20 is a home video game console, and the display device 10 is a head mounted display that is connected to the home video game console.

Further, the display device 10 includes, as the sensor part 13, a pulse wave sensor, a respiration sensor, a humidity sensor, a temperature sensor, or the like.

The user inputs, to the information processing apparatus 20, information regarding the user' name, sex, and age, and whether the user has short-sightedness, long-sightedness, or astigmatism or not in advance as prior information, to thereby store the information in the information processing apparatus 20.

Further, the user executes a test application prepared in advance before playing a game using the display device 10, for example, when setting default values to the display device 10. With this test application, the display device 10 displays an experimental virtual space image involving at least one kind of viewpoint movement.

The user wears the display device 10 and executes the test application. The information processing apparatus 20 acquires, while the virtual space image is being presented to the user by the test application, information associated with the content of the virtual space (content information) and the vital information of the user, and records the information as acquisition information as exemplified in FIG. 4 (S11).

Figure 4:
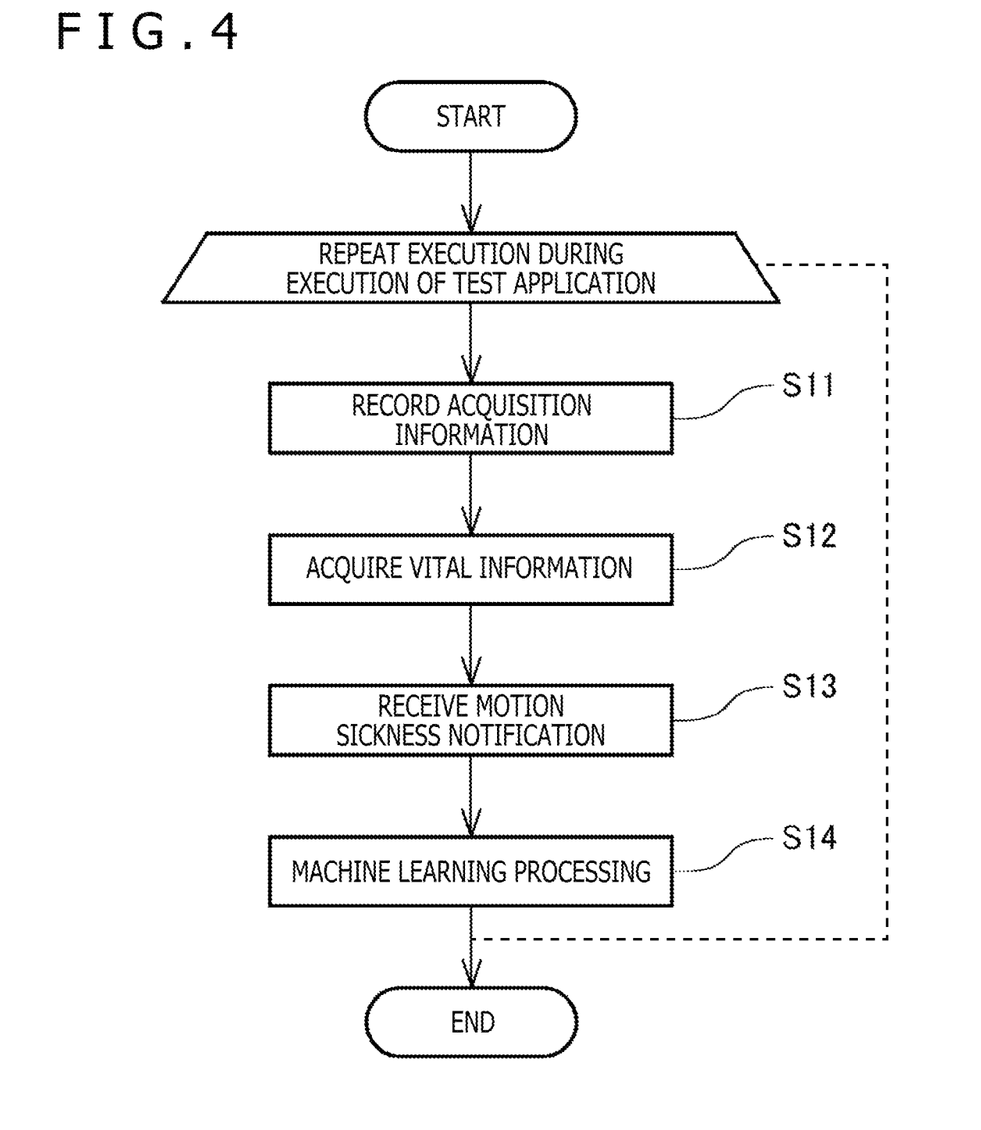
FIG. 4 is a flow chart illustrating an operation example of the information processing apparatus according to the embodiment of the present invention.

Note that, here, the information associated with the content of the virtual space includes the execution time of the test application (how much time has passed since the user had started watching the virtual space image by the test application) and information indicating how much the virtual space image being presented is moved such as the rotation speed of a camera in the virtual space and the position, the rotation angle, the movement speed, and the acceleration of the camera. Further, the information processing apparatus 20 acquires, as the vital information of the user, the user's heart rate or respiratory rate (the number of breaths per minute or the like), humidity (humidity inside the housing 101 of the display device 10 that the user is wearing), or temperature (the user's body temperature or the like) detected by the display device 10, and records the vital information as part of the acquisition information (S12).

The information processing apparatus 20 receives, when the user performs operation to notify that the user has gotten motion sickness during the presentation of the virtual space image by the test application, the content of the operation (S13).

The information processing apparatus 20 repeatedly executes the machine learning processing at a timing determined in advance (for example, a timing with a predetermined interval such as every 10 seconds) with input information (explanatory variable) being the prior information stored in advance and the acquisition information such as the information associated with the content of the virtual space and the vital information of the user acquired after the last timing (after the test application has been executed when the machine learning processing is performed for the first time), and output information (objective variable) being the content of the motion sickness notification (binary information indicating whether the user has gotten motion sickness or not or numerical information indicating the degree of motion sickness). Note that, when there is no notification of motion sickness at this point, the information processing apparatus 20 executes the machine learning processing with a determination that the user has not gotten motion sickness (with output information being binary information that is information indicating that the user has not gotten motion sickness or numerical information that is a value indicating that the user has not gotten motion sickness, for example, "0") (S14). This processing is repeatedly performed until the execution of the test application ends.

The information processing apparatus 20 stores the information such as a decision tree obtained as a result of the machine learning processing.

Figure 5:
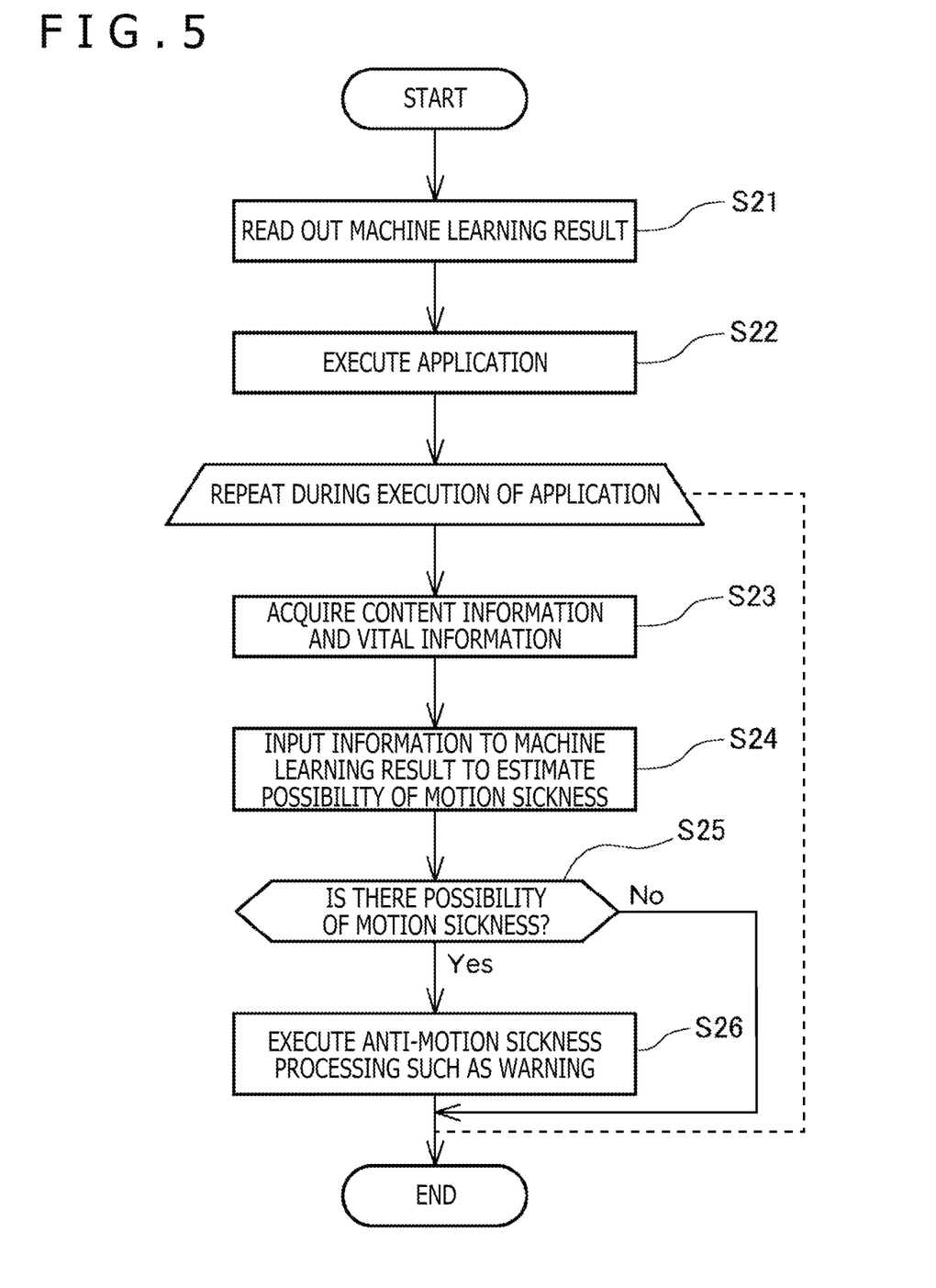
FIG. 5 is a flow chart illustrating another operation example of the information processing apparatus according to the embodiment of the present invention.

Further, when the user instructs the execution of the game application thereafter, the information processing apparatus 20 reads out, as exemplified in FIG. 5, the stored prior information and the decision tree information generated by the learning processing (S21). Further, the information processing apparatus 20 starts to execute the processing of the game application, which has been designated to be executed, to present a virtual space image to the user (S22), and executes the following processing by executing the game application while presenting the virtual space image.

Specifically, the information processing apparatus 20 acquires information associated with the content of the virtual space (content information) and the vital information of the user (S23). Then, the information processing apparatus 20 obtains an estimation result on a notification of motion sickness (binary information indicating whether there is a notification of motion sickness or not or numerical information indicating the degree of motion sickness) by using, as inputs, the read-out prior information and the received acquisition information in the already read-out decision tree (S24). Note that, here, there may be used what is called random forests in which an apparatus learns input information regarding the different combinations of a plurality of decision trees, and uses the average value of the outputs of the plurality of decision trees.

The information processing apparatus 20 determines whether or not, as the numerical information indicating the degree of motion sickness, which has been obtained here as the estimation result on the notification of motion sickness, a value exceeding a threshold determined in advance has been output (whether there is a possibility that the user gets motion sickness or not) (S25). Here, in a case where it is determined that there is a possibility that the user gets motion sickness (S25: Yes), the information processing apparatus 20 controls the display device 10 to display an icon or an information window indicating that conditions that make the user get motion sickness are satisfied (S26: anti-motion sickness processing).

The user can recognize, by watching the warning, that the user is in a condition of easily getting motion sickness or the user has gotten motion sickness without consciousness, and can thus take a measure such as consciously taking a break. The processing of the information processing apparatus 20 is repeatedly performed until the game application ends.

Note that, in a case where it is determined in Processing S25 that there is no possibility that the user gets motion sickness (S25: No), the information processing apparatus 20 performs control not to execute the anti-motion sickness processing (Processing S26).

According to the present embodiment, the estimation of the possibility of motion sickness depending on individual differences in users can be performed, and processing suitable therefor can be executed.

Modified Example

Further, in the description so far, the information processing apparatus 20 estimates whether there may be a notification of motion sickness from the user by using a result obtained by performing machine learning in advance, and performs the processing of, for example, changing the way in which a virtual space image is being presented and performing control to display warning in a case where it is determined that there may be a notification of motion sickness as a result of the estimation. The present embodiment is, however, not limited to this.

For example, the information processing apparatus 20 may receive, when the user performs operation to notify that the user has gotten motion sickness during the execution of a game application, the content of the operation. Here, the notification indicating that the user has gotten motion sickness is made by, for example, predetermined operation on the button of the game controller or the like, as in the case of machine learning. Further, as in the case of machine learning described above, the content of the notification may be binary information indicating whether the user has gotten motion sickness or not or a notification based on the user's subjectivity on the degree of motion sickness. In a case where a notification on the degree of motion sickness is received, the information includes graded numerical information such as integer values of from 0 to 1023, for example. The input of the degree of motion sickness may be obtained on the basis of pressing force on the button in a case where pressing force is acquirable, or of a button pressing frequency (how many times the button is pressed in a predetermined period of time). For example, the degree of motion sickness may be determined as "n" when the button has been operated n times in the last one minute.

Then, in a case where there is a notification indicating that the user has gotten motion sickness or the degree of motion sickness exceeds a threshold determined in advance, the information processing apparatus 20 may perform processing similar to that in the anti-motion sickness processing part 52 described above, such as changing the way in which a virtual space image is being presented or performing control to display warning, irrespective of whether estimation based on machine learning has been performed or not or even when it has been determined that there is no possibility of a notification of motion sickness as a result of estimation based on machine learning.

Example for Analysis

Note that, in the example described above, information such as a decision tree used for machine learning is used for the processing of estimating motion sickness during the execution of a game application and taking measures therefor. Information such as a decision tree used for machine learning may, however, also be used for processing for analyzing factors that make users easily get motion sickness.

For example, the most important factor for motion sickness can be analyzed with the use of decision tree information. Further, when a decision tree supporting the combinations of a plurality of pieces of input information is generated, a correlation between the pieces of input information, and how high the possibility of motion sickness is can be analyzed from the combinations of the pieces of input information.

With this, for example, knowledge such as that users having short-sightedness easily get motion sickness when their point of views are translated can be obtained to be used for game application development. Further, at the time of an actual game application development test, information regarding what types of users easily get motion sickness in certain scenes (the fact that users having short-sightedness easily get motion sickness, for example) can be provided, for example.

REFERENCE SIGNS LIST

1 Image presentation apparatus, 10 Display device, 11 Display part, 12 Control part, 13 Sensor part, 14 Communication part, 20 Information processing apparatus, 21 Control part, 22 Storage part, 23 Operation part, 24 Display control part, 25 Communication part, 31 Application processing part, 32 Information acquisition part, 33 Learning part, 34 Motion sickness determination part, 41 Notification reception part, 42 Learning processing part, 51 Estimation part, 52 Anti-motion sickness processing part, 100 Display unit, 101 Housing, 102 Processor unit, 110 Wearing band

The invention claimed is:

1. An image presenter configured to present a virtual space image to a user, comprising:
an acquisition information reception processor for receiving, acquisition information that is acquired during the presentation of the image;
a notification reception processor for receiving a notification from the user that indicates that the user has entered a predetermined condition; and
a learning processing processor for learning a relationship between the acquisition information and content of the notification by machine learning,
wherein a result of the machine learning is used for predetermined processing during the presentation of the virtual space image to the user.

2. The image presentation apparatus according to claim 1, wherein prior to the presentation of the virtual space image that the user wants to watch, a test virtual space image determined in advance is presented,
wherein the acquisition information reception processor receives acquisition information that is acquired during the presentation of the test virtual space image,
wherein the notification reception processor receives a notification from the user that indicates that the user has entered the predetermined condition during the presentation of the test virtual space image,
wherein the learning processing processor learn a relationship between the acquisition information acquired during the presentation of the test virtual space image and the content of the notification by machine learning, and
wherein a result of the machine learning is used for predetermined processing during the presentation of the virtual space image that the user wants to watch to the user.

3. The image presentation apparatus according to claim 1, further comprising:
a receiving processor for receiving user-related information including information associated with eyesight of the user,
wherein the learning processing processor learns relationships between the user-related information and the acquisition information, and the content of the notification by machine learning.

4. The image presentation apparatus according to claim 1, wherein the acquisition information reception processor receives content information associated with content of the image being presented and vital information of the user during the presentation of the image to the user.

5. The image presentation apparatus according to claim 1, wherein, when the notification reception processor receives the notification from the user that indicates that the user has entered the predetermined condition, a way in which the virtual space image is being presented is changed.

6. The image presentation apparatus according to claim 1, wherein the predetermined processing includes processing of presenting warning.

7. The image presentation apparatus according to claim 1, wherein the predetermined processing includes processing of changing the way in which the virtual space image is being presented.

8. The image presentation apparatus according to claim 1, further comprising:
a display device that is worn on a head of the user and configured to present a left-eye image and a right-eye image to a left eye and a right eye of the user, respectively, to thereby present the virtual space image.

9. The image presentation apparatus according to claim 8, wherein the display device includes a humidity sensor configured to detect humidity and output the humidity as the vital information.

10. An image presentation method for presenting a virtual space image to a user by using a computer, comprising:
receiving acquisition information that is acquired during the presentation of the image;
receiving a notification from the user that indicates that the user has entered a predetermined condition; and
learning a relationship between the acquisition information and content of the notification by machine learning, wherein a result of the machine learning is used for predetermined processing during the presentation of the virtual space image to the user.

11. A computer-readable non-temporary recording medium having stored therein a program for presenting a virtual space image to a user,
wherein the program includes:
receiving acquisition information that is acquired during the presentation of the image;
receiving a notification from the user that indicates that the user has entered a predetermined condition; and
learning a relationship between the acquisition information and content of the notification by machine learning,
wherein a result of the machine learning is used for predetermined processing during the presentation of the virtual space image to the user.

* * * * *